(12) United States Patent
Hammadou

(10) Patent No.: US 10,854,068 B2
(45) Date of Patent: *Dec. 1, 2020

(54) METHOD AND SYSTEM FOR CONFIGURABLE SECURITY AND SURVEILLANCE SYSTEMS

(71) Applicant: AVIGILON PATENT HOLDING 1 CORPORATION, Vancouver (CA)

(72) Inventor: Tarik Hammadou, Mountain View, CA (US)

(73) Assignee: AVIGILON PATENT HOLDING 1 CORPORATION, Vancouver (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/387,499

(22) Filed: Apr. 17, 2019

(65) Prior Publication Data

US 2019/0251834 A1 Aug. 15, 2019

Related U.S. Application Data

(63) Continuation of application No. 15/442,490, filed on Feb. 24, 2017, now Pat. No. 10,311,711, which is a
(Continued)

(51) Int. Cl.
*G08B 29/18* (2006.01)
*H04N 7/18* (2006.01)
(Continued)

(52) U.S. Cl.
CPC ....... *G08B 29/18* (2013.01); *G08B 13/19656* (2013.01); *G08B 13/19665* (2013.01);
(Continued)

(58) Field of Classification Search
CPC . G06F 15/177; G08B 29/18; G08B 13/19656; H04L 63/0428; H04L 63/08; H04L 63/10
See application file for complete search history.

(56) References Cited

U.S. PATENT DOCUMENTS 4,688,169 A * 8/1987 Joshi ................... G06F 21/121
726/29
5,226,145 A 7/1993 Moronaga et al.
(Continued)

FOREIGN PATENT DOCUMENTS

CN 1297547 A 5/2001
CN 1360440 A 7/2002
(Continued)

OTHER PUBLICATIONS

The State Intellectual Property Office of P.R. China, The Notification of the Third Office Action, in Application No. 200680016779.X, Issue Serial No. 2011032000047710, dated Mar. 23, 2011.
(Continued)

*Primary Examiner* — An T Nguyen
(74) *Attorney, Agent, or Firm* — BakerHostetler

(57) ABSTRACT

A method and system for a configurable security and surveillance system are provided. A configurable security and surveillance system may comprise at least one programmable sensor agent and/or at least one programmable content analysis agent. A plurality of processing features may be offered by the configurable security and surveillance system by programming configurable hardware devices in the programmable sensor agents and/or the programmable content analysis agents via a system manager. Device programming files may be utilized to program the configurable hardware devices. The device programming files may be encrypted and decryption keys may be requested to enable the programming of different processing features into the programmable sensor agents and/or the programmable content analysis agents. The device programming files and/or the decryption keys may be received via a network transfer and/or via a machine-readable media from an e-commerce vendor.

25 Claims, 13 Drawing Sheets

Related U.S. Application Data continuation of application No. 15/130,729, filed on Apr. 15, 2016, now Pat. No. 9,595,182, which is a continuation of application No. 14/594,867, filed on Jan. 12, 2015, now Pat. No. 9,342,978, which is a continuation of application No. 11/107,671, filed on Apr. 15, 2005, now abandoned.

(51) Int. Cl.
*G08B 29/00* (2006.01)
*H04L 29/06* (2006.01)
*G08B 13/196* (2006.01)
*H04N 7/167* (2011.01)

(52) U.S. Cl.
CPC .......... *G08B 29/00* (2013.01); *H04L 63/0428* (2013.01); *H04N 7/181* (2013.01); *H04N 7/1675* (2013.01)

(56) References Cited

U.S. PATENT DOCUMENTS

| | | | |
|---|---|---|---|
| 5,477,264 | A | 12/1995 | Sarbadhikari et al. |
| 5,594,842 | A | 1/1997 | Kaufman et al. |
| 5,666,157 | A | 9/1997 | Aviv |
| 5,935,249 | A | 8/1999 | Stern et al. |
| 6,064,303 | A | 5/2000 | Klein et al. |
| 6,073,163 | A | 6/2000 | Clark et al. |
| 6,151,657 | A | 11/2000 | Sun et al. |
| 6,154,728 | A | 11/2000 | Sattar et al. |
| 6,360,362 | B1 | 3/2002 | Fichtner et al. |
| 6,525,761 | B2 | 2/2003 | Sato et al. |
| 6,646,676 | B1 | 11/2003 | DaGraca et al. |
| 7,219,365 | B2 | 5/2007 | Sato et al. |
| 7,302,562 | B1 | 11/2007 | Jacobson et al. |
| 7,350,224 | B2 | 3/2008 | Creamer et al. |
| 7,423,670 | B2 | 9/2008 | Kawai et al. |
| 7,467,400 | B1* | 12/2008 | Moss ................ G07C 9/00166 713/150 |
| 7,657,884 | B2 | 2/2010 | Okonnen et al. |
| 8,286,125 | B2* | 10/2012 | McDonald ................ G06F 8/38 716/138 |
| 9,342,978 | B2 | 5/2016 | Hammadou |
| 2002/0055910 | A1 | 5/2002 | Durbin |
| 2002/0111698 | A1 | 8/2002 | Graziano et al. |
| 2002/0171741 | A1 | 11/2002 | Tonkin et al. |
| 2003/0014673 | A1 | 1/2003 | Baum et al. |
| 2003/0048926 | A1 | 3/2003 | Watanabe |
| 2003/0050060 | A1 | 3/2003 | Leslie et al. |
| 2003/0061019 | A1* | 3/2003 | Swoboda ........ G01R 31/31705 703/23 |
| 2003/0067387 | A1 | 4/2003 | Kwon et al. |
| 2004/0095506 | A1 | 5/2004 | Scott |
| 2004/0183903 | A1 | 9/2004 | Pedersen |
| 2004/0184529 | A1 | 9/2004 | Henocq et al. |
| 2004/0212503 | A1* | 10/2004 | Stilp .................... G06K 7/0008 340/572.1 |
| 2004/0215750 | A1* | 10/2004 | Stilp .................... G06K 7/0008 709/220 |
| 2005/0007479 | A1 | 1/2005 | Ahiska |
| 2005/0010649 | A1 | 1/2005 | Payne et al. |
| 2005/0028215 | A1 | 2/2005 | Ahiska |
| 2005/0138401 | A1 | 6/2005 | Terao et al. |
| 2005/0289274 | A1 | 12/2005 | Ghercioiu et al. |
| 2006/0035621 | A1* | 2/2006 | Ghercioiu .............. H04W 88/02 455/403 |
| 2006/0200253 | A1* | 9/2006 | Hoffberg ................ G05B 15/02 700/19 |
| 2006/0236375 | A1* | 10/2006 | Hammadou ........... H04N 7/181 726/3 |
| 2006/0294520 | A1* | 12/2006 | Anderson ............ G06F 1/3203 718/100 |
| 2008/0001734 | A1* | 1/2008 | Stilp ........................ G05B 9/03 340/539.22 |
| 2019/0251834 | A1* | 8/2019 | Hammadou ..... G08B 13/19656 |

FOREIGN PATENT DOCUMENTS

| | | |
|---|---|---|
| CN | 1588312 A | 3/2005 |
| EP | 1447781 A2 | 8/2004 |
| EP | 1519314 A1 | 3/2005 |
| GB | 2369904 A | 6/2002 |
| JP | 2004-180190 A | 6/2004 |
| WO | WO 1999/042924 A1 | 8/1999 |
| WO | WO 1999/044360 A1 | 9/1999 |

OTHER PUBLICATIONS

European Search Report for European Patent Application No. 06721368.6, dated May 27, 2009.
Pan et al.; "Detection of Slow-Motion Replay Segments in Sports Video for Highlights Generation"; IEEE; 2001; p. 135-140.
Tan et al.; "Rapid Estimation of Camera Motion from Compressed Video with Application to Video Annotation"; IEEE Transactions on Circuits and Systems for Video Technology; Feb. 2000; vol. 10 No. 1; p. 133-146.
Kobla et al.; "Detection of Slow-Motion Replay Sequences for Identifying Sports Videos"; Proc. IEEE Workshop on Multimedia Signal Processing; 1999; p. 135-140.
"MPEG-7 Applications Document v.9"; Jul. 1999; p. 1-36.
Tan et al.; "A New Method for Camera Motion Parameter Estimation"; Proc. IEEE Int'l Conference on Image Processing; vol. 2; 1995; p. 722-726.
U.S. Pat. No. 8,508,607; Declaration of Dr. Kevin Jeffay; dated Aug. 13, 2013; 137 pages.
U.S. Pat. No. 8,508,607; Petition for Inter Partes Review; dated Aug. 13, 2013; 80 pages.
U.S. Pat. No. 8,508,607; Patent Owner's Preliminary Response; dated Oct. 10, 2018; 57 pages.
Excerpt of File History of U.S. Appl. No. 11/107,671 to Hammadou, including (i) Decision on Appeal filed Jan. 7, 2015; (ii) Notice of Appeal issued Apr. 15, 2005; (iii) Response to Final Office Action filed Sep. 8, 2011; and (iv) Final Office Action dated Jul. 8, 2011.

* cited by examiner

METHOD AND SYSTEM FOR CONFIGURABLE SECURITY AND SURVEILLANCE SYSTEMS

CROSS REFERENCE TO RELATED APPLICATIONS

This application is a continuation of U.S. patent application Ser. No. 15/442,490, filed Feb. 24, 2017; which is a continuation of U.S. patent application Ser. No. 15/130,729, filed Apr. 15, 2016, now U.S. Pat. No. 9,595,182, issued Mar. 14, 2017; which is a continuation of U.S. patent application Ser. No. 14/594,867 filed on Jan. 12, 2015, now U.S. Pat. No. 9,342,978, issued May 17, 2016, which is a continuation of U.S. patent application Ser. No. 11/107,671 filed on Apr. 15, 2005, the entirety of each application is hereby incorporated herein by reference.

TECHNICAL FIELD

Certain embodiments of the invention relate to security systems. More specifically, certain embodiments of the invention relate to a method and system for configurable security and surveillance systems.

BACKGROUND

Security and surveillance operations may require security management systems that are capable of providing either a single security function or, in some instances, a wide range of integrated security functions. Most security management systems, however, are designed to operate as autonomous systems that provide a single security function such as intrusion detection, access control, or audio and/or video surveillance and recording, for example. These security management systems may not generally support the addition of other security functions and/or the addition of other features to an existing security function without a substantial investment in hardware and/or software. As a result, multiple security management systems are generally utilized when a particular application requires multiple security functions. In this regard, any integration that may be necessary to efficiently and/or effectively operate multiple security management systems is typically left to an installer, an integrator, and/or the customer to carry out.

One of the needs driving security management systems capable of supporting a wide range of integrated security functions and/or features are security operations for large enterprises or entities. These large entities may have many different security requirements extending over multiple locations. A centrally monitored integrated security management system may allow administrators or controllers at a central control center to efficiently oversee the many security activities that are supported at the remote facilities.

The limited ability of most security management systems to add security functions, to add features to existing security functions, and/or to easily integrate with other security management systems generally results in an inefficient use of available resources. For example, multiple security management systems that have not been efficiently integrated may have multiple data entry points and/or duplicate databases. Moreover, limited integration capability may also create inefficient use of personnel by duplicating data entry tasks, requiring manual data exchange between systems, and implementing multiple training requirements for the various systems being utilized. Moreover, even when integration between multiple security management systems has been effectively implemented, continued compatibility may be lost when hardware and/or software on various portions of at least one of the multiple security management systems is upgraded.

A common security function that is generally provided in security management systems is video surveillance. Video surveillance operations may require, in some instances, to be provided with additional features or may require compatibility with other security functions. Most video surveillance operations are provided by stand-alone closed circuit television (CCTV) systems that are commonly found in, for example, office buildings, external structures, schools, railway stations, and even on city streets. An effectively integrated security management systems may require that a CCTV system be compatible with other security functions such as access control methods augmented with biometrics, security tracking systems, and/or access tracking systems, for example. However, most CCTV systems are not easily upgradeable nor are they easily integrated with other security functionality. As a result, integrated security management systems comprising video surveillance operations are not readily available. Moreover, the ability of these integrated security management systems to evolve and provide further security functions and/or additional features are generally limited or may be accomplished only with a substantial investment in hardware and/or software.

Further limitations and disadvantages of conventional and traditional approaches will become apparent to one of skill in the art, through comparison of such systems with some aspects of the present invention as set forth in the remainder of the present application with reference to the drawings.

SUMMARY

A system and/or method for configurable security and surveillance systems, substantially as shown in and/or described in connection with at least one of the drawings, as set forth more completely in the claims.

Various advantages, aspects and novel features of the present invention, as well as details of an illustrated embodiment thereof, will be more fully understood from the following description and drawings.

DETAILED DESCRIPTION OF ILLUSTRATIVE EMBODIMENTS

Certain embodiments of the invention may be found in a method and system for a configurable security and surveillance system. In accordance with an embodiment of the invention, a configurable security and surveillance system may comprise at least one programmable sensor agent and/or at least one programmable content analysis agent. A plurality of processing features may be offered by the configurable security and surveillance system by programming configurable hardware devices in the programmable sensor agents and/or the programmable content analysis agents via a system manager. Device programming files may be utilized to program the configurable hardware devices. The device programming files may be encrypted, and decryption keys may be requested to enable the programming of different processing features into the programmable sensor agents and/or the programmable content analysis agents. The device programming files and/or the decryption keys may be received via a network transfer and/or via a machine-readable media from an e-commerce vendor.

Figure 1A:
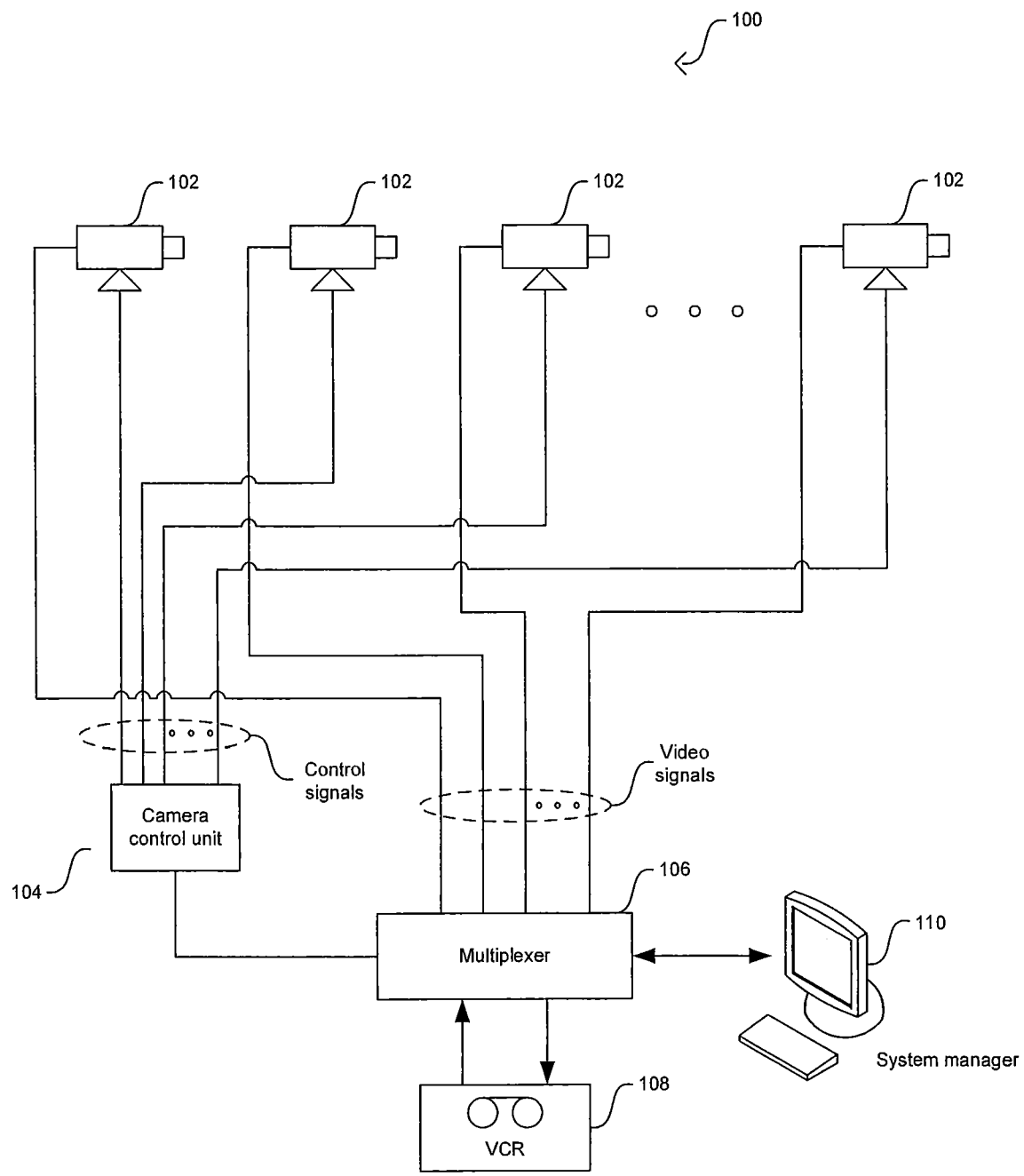
FIG. 1A illustrates an exemplary analog security and surveillance system, in connection with an embodiment of the invention.

FIG. 1A illustrates an exemplary analog security and surveillance system, in connection with an embodiment of the invention. Referring to FIG. 1, there is shown an analog security and surveillance system 100 that comprises at least one analog camera 102, a camera control unit 104, a multiplexer 106, a system manager 110, and a videocassette recorder (VCR) 108. The analog camera 102 may comprise suitable logic, circuitry, code, and/or hardware that may be adapted to capture video information from a particular location. The analog camera 102 may receive control signals from the camera control unit 104 that may be utilized to control various operations, for example, zoom, tilt, and/or pan. The analog camera 102 may generate at least one video signal that corresponds to the video information captured by the analog camera 102. In some instances, the analog camera 102 may provide front end processing of the video information before generating the video signal. The analog camera 102 may transfer at least a portion of the generated video signal to the multiplexer 106. The video signals may be transferred to the multiplexer 106 via coaxial cables, for example.

The system manager 110 may comprise suitable logic, circuitry, code, and/or hardware that may be adapted to allow a user to control the operation of an analog camera 102, to control the recording of at least a portion of the video signals generated by an analog camera 102, and to display at least a portion of the video information in the video signals generated by an analog camera 102. In this regard, the system manager 110 may be utilized to control at least a portion of the operation of the camera control unit 104, the multiplexer 106, and/or the VCR 108. The camera control unit 104 may comprise suitable logic, circuitry, code, and/or hardware that may be adapted to receive control information from the system manager 110 via the multiplexer 104 and to generate control signals from the received control information. The generated control signals may be transferred to at least one analog camera 102 to control its operation.

The multiplexer 106 may comprise suitable logic, circuitry, code, and/or hardware that may be adapted to select a mode of operation. For example, during a recording mode, the multiplexer 106 may receive video information from at least one analog camera 102 and may transfer that video information to the VCR 108. During a playback mode, for example, the multiplexer 108 may retrieve stored video information from the VCR 108 and may transfer the video information to a display portion of the system manager 110. The display portion of the system manager 110 may display the video information from at least one analog camera 102 at the same time. During a control mode, for example, the system manager 110 may transfer control information to the camera control unit 104 via the multiplexer 106. During a display mode, for example, the video information received from at least one analog camera 102 may be displayed directly to the display portion of the system manager 110. In some instances, the multiplexer 106 may be adapted to have more than one mode of operation active at the same time. For example, the recording mode and display mode may be utilized at the same time to record and display video information onto the VCR 108 and the display portion of the system manager 110 respectively.

Figure 1B:
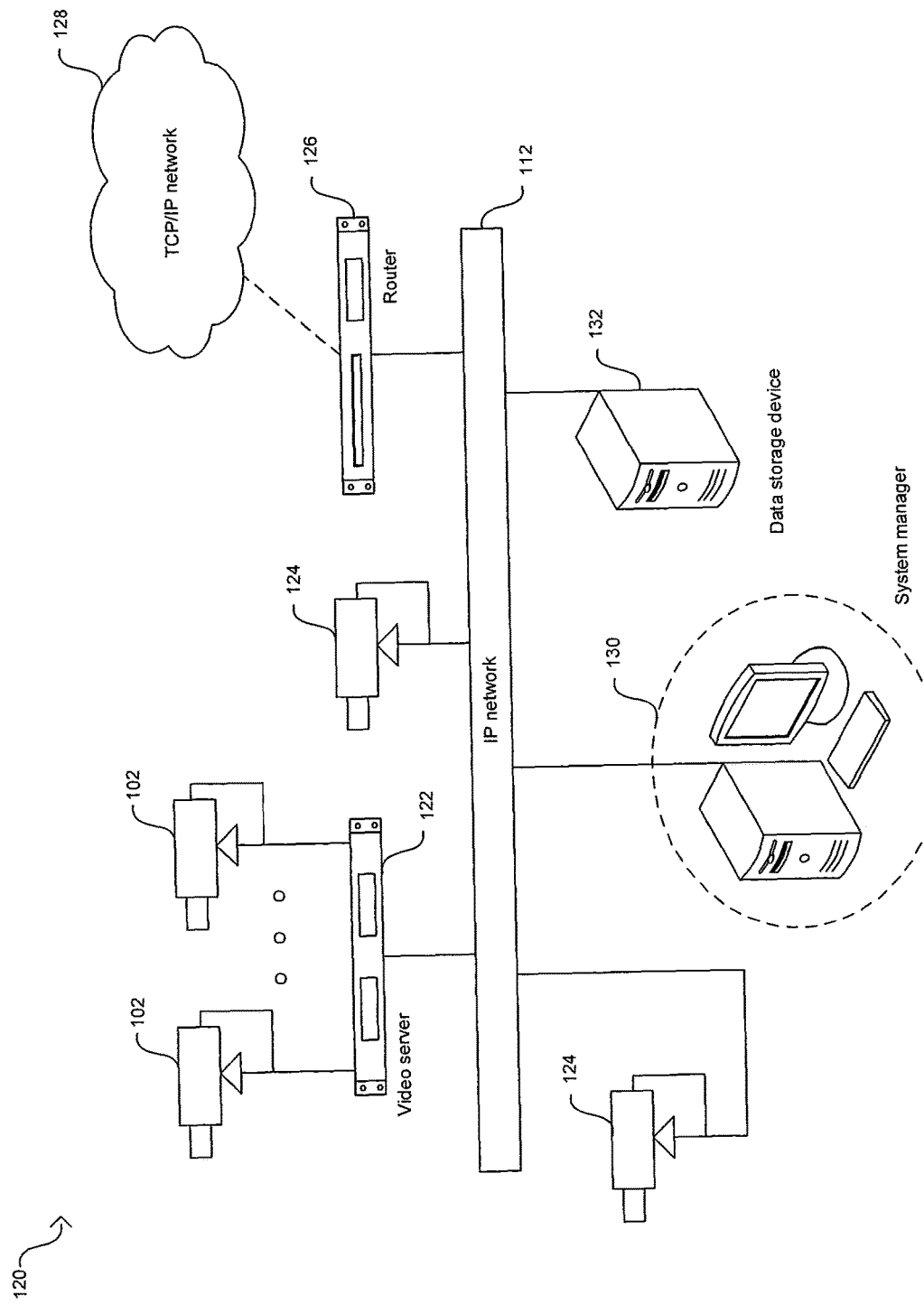
FIG. 1B illustrates an exemplary Internet protocol (IP)-based security and surveillance system, in connection with an embodiment of the invention.

FIG. 1B illustrates an exemplary Internet protocol (IP)-based security and surveillance system, in connection with an embodiment of the invention. Referring to FIG. 1B, there is shown an IP-based security and surveillance system 120 that comprises at least one analog camera 102 as described in FIG. 1A, an IP network 112, a video server 122, at least one IP-based digital camera 124, a router 126, a transfer control protocol/Internet protocol (TCP/IP) network 128, a system manager 130, and a data storage device 132. The analog camera 102 may be as described in FIG. 1A. The IP network 112 may be a communication network that may be implemented as a local area network (LAN), a wide area network (WAN), a campus area network (CAN), a metropolitan area network (MAN), and/or a home area network (HAN), for example. The IP network 112 may be a wireline and/or a wireless network and components coupled to the IP network 112 may be coupled via a wireline and/or a wireless connection.

The video server 122 may comprise suitable logic, circuitry, code and/or hardware that may be adapted to receive video information from at least one analog camera 102 and to transfer control information to at least one analog camera 102. The video server 122 may be communicatively coupled to the IP network 112 via a wireline and/or a wireless connection. The video server 122 may also be adapted to compress the video information received from an analog camera 102 and transfer the compressed video information to the system manager 130 and/or the data storage device 132, for example. The video server 122 may correspond to a specified network address in the IP network 112.

The IP-based digital camera 124 may comprise suitable logic, circuitry, code, and/or hardware that may be adapted to capture video information and transfer video information to the IP network 112. The IP-based digital camera 124 may be adapted to receive control information via the IP network 112. The IP-based digital camera 124 may comprise an image sensor, an image processor, and a compression engine. The image sensor may be, for example, a complementary metal-oxide-semiconductor (CMOS) image sensor or a charge-coupled device (CCD) image sensor and may be adapted to capture video information. The image processor may be, for example, a digital signal processor (DSP) or a dedicated application specific integrated circuit (ASIC) and may be adapted to perform front-end processing of the video information captured by the image sensor. The compression engine may comprise suitable logic, circuitry, and/or code that may be adapted to encode the processed video information before transfer to the IP network 112. The control information received by the IP-based digital camera 124 may be utilized to control, for example, zoom, tilt, and/or pan operations. Each IP-based digital camera 124 may correspond to a specified network address in the IP network 112.

The router 126 may comprise suitable logic, circuitry, code, and/or hardware that may be adapted to communicatively couple the IP network 112 with the TCP/IP network 128. The router 126 may transfer at least a portion of the video information captured by at least one analog camera 102 and/or at least one IP-based digital camera 124 and a portion of the control information generated by the system manager 130 to a device, component, and/or element communicatively coupled to the TCP/IP network 128. The router 126 may correspond to a specified network address in the IP network 112. The TCP/IP network 128 shown in FIG. 1B may correspond to, for example, the Internet.

The data storage device 132 may comprise suitable logic, circuitry, and/or code that may be adapted to store at least a portion of the video information captured by at least one analog camera 102 and/or at least one IP-based digital camera 124. In some instances, the data storage device 132 may be part of a network attached storage (NAS) and/or a storage area network (SAN), for example. The data storage device 132 may correspond to a specified network address in the IP network 112.

The system manager 130 may comprise suitable logic, circuitry, and/or code that may be adapted to control the operation of at least one analog camera 102 and/or at least one IP-based digital camera 124. In this regard, the system manager 130 may generate control information that may be transferred to at least one analog camera 102 and/or at least one IP-based digital camera 124 via the IP network 112. The system manager 130 may also display at least a portion of the compressed video information captured by an analog camera 102 and/or an IP-based digital camera 124. Moreover, the system manager 130 may receive information stored in the data storage device 132 and may process and/or display the received information. The system manager 130 may correspond to a specified network address in the IP network 112.

Figure 2A:
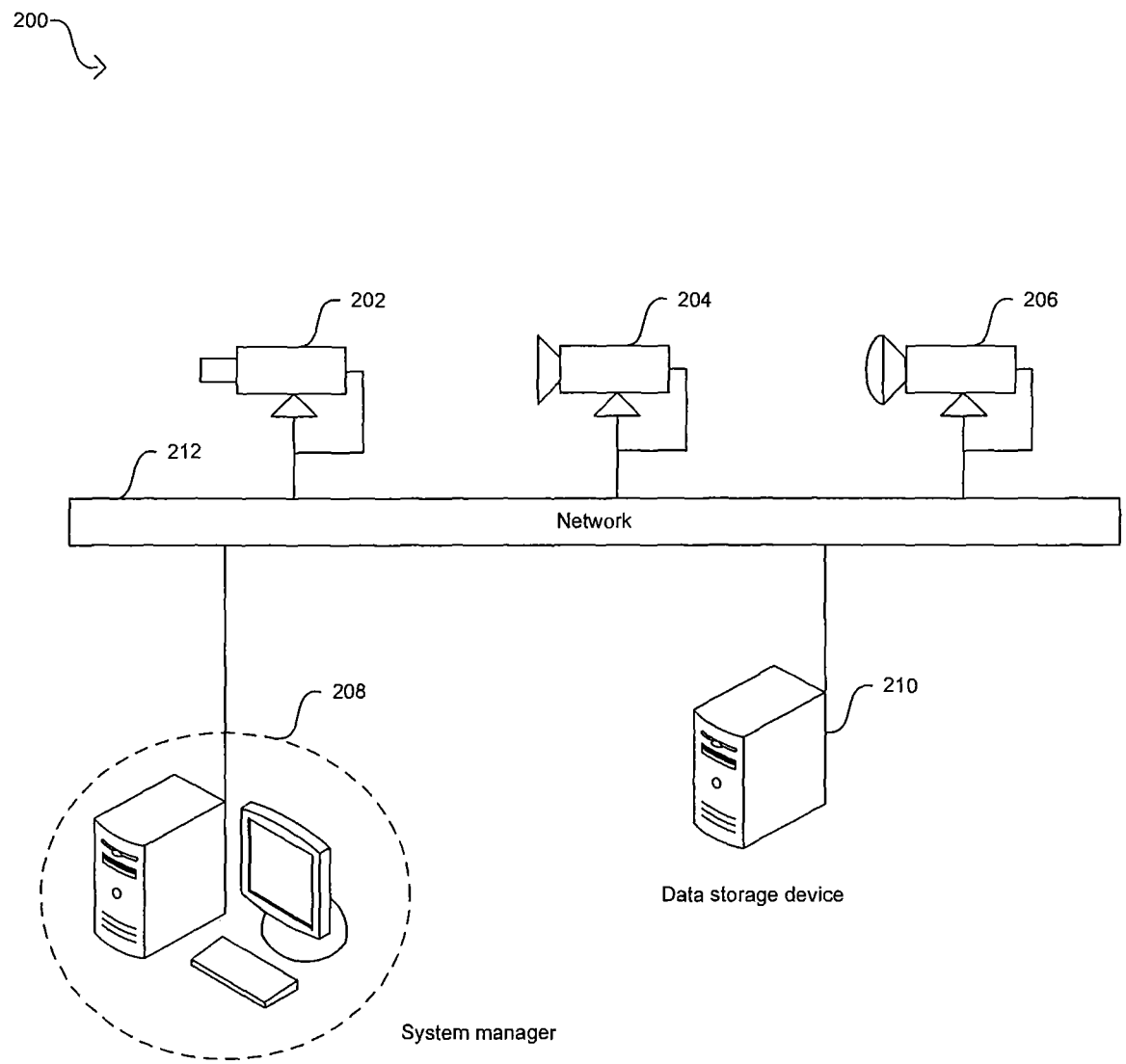
FIG. 2A illustrates an exemplary configurable security and surveillance system with programmable sensor agents, in accordance with an embodiment of the invention.

FIG. 2A illustrates an exemplary configurable security and surveillance system with programmable sensor agents, in accordance with an embodiment of the invention. Referring to FIG. 2A, there is shown a configurable security and surveillance system 200 that comprises a first programmable sensor agent 202, a second programmable sensor agent 204, a third programmable sensor agent 206, a system manager 208, a data storage device 210, and a network 212. The network 212 may comprise suitable hardware that may be adapted to communicatively couple a plurality of components, devices, and/or elements. In this regard, the components, devices, and/or elements coupled to the network 212 may correspond to specified network address and/or network locations in the network 212. The network 212 may be, for example, a TCP/IP network, but need not be so limited. In some instances, portions of the network 212 may be implemented as wireless connections while other portions may be implemented as wireline connections. Moreover, components communicatively coupled to the network 212 may be coupled via wireline or wireless connections, for example.

The first programmable sensor agent 202, the second programmable sensor agent 204, and the third programmable sensor agent 206 may comprise suitable logic, circuitry, code, and/or hardware that may be adapted to detect a physical event, generate at least one signal that corresponds to the physical event detected, and transfer the generated signal to the data storage device 210 and/or the system manager 208 via the network 212. Three different types of programmable sensor agents are shown in FIG. 2A as examples to indicate that a plurality of programmable sensor agent types may be utilized to detect different physical events. As a result, the types and the number of programmable sensor agents may depend on the security functions that need to be integrated in the configurable security and surveillance system 200. For example, a programmable sensor agent may correspond to a surveillance camera, a thermal sensor, or a biological/chemical sensor. In the example illustrated in FIG. 2A, each of the programmable sensor agents 202, 204, and 206 may correspond to a specified network address in the network 212.

A programmable sensor agent may be adapted to receive control information from the system manager 208 via the network 212. Moreover, a programmable sensor agent may be adapted to be programmed or configured by the system manager 208. In this regard, the programming or configuration may be performed to add and/or remove features that correspond to a security function or functions performed by a programmable sensor agent. The programming or configuration may be performed dynamically, that is, while the configurable security and surveillance system 200 is in operation. In other instances, the programming or configuration may be performed during installation or during maintenance periods when at least a portion of the configurable security and surveillance system 200 is not in operation.

The data storage device 210 may comprise suitable logic, circuitry, and/or code that may be adapted to store at least a portion of the signals generated by the programmable sensor agents. In some instances, the data storage device 210 may be part of a network attached storage (NAS) and/or a storage area network (SAN), for example. The data storage device 210 may correspond to a specified network address in the network 212. In some instances, more than one data storage device 210 may be utilized in the configurable security and surveillance system 200.

The system manager 208 may comprise suitable logic, circuitry, and/or code that may be adapted to control the operation of at least one of the programmable sensor agents in the configurable security and surveillance system 200. In this regard, the system manager 208 may generate control information that may be transferred to the programmable sensor agents via the network 212. The system manager 208 may also be adapted to display at least a portion of the information in the signals generated by the programmable sensor agents. Moreover, the system manager 208 may receive information stored in the data storage device 210 and may process and/or display the information received from the data storage device 210. The system manager 210 may correspond to a specified network address in the network 212.

The system manager 208 may also be adapted to program or configure security features into the programmable sensor agents in the configurable security and surveillance system 200. In this regard, the system manager may receive device programming files that may be utilized to program or configure a portion of the programmable sensor agents in order to provide new, additional, and/or upgraded security features. The device programming files may be transferred to the corresponding programmable sensor agents via the network 212. In some instances, the device programming files received by the system manager 208 may be encrypted or protected. When the device programming files are encrypted, the system manager 208 may receive at least one decryption key or password that may be utilized to decrypt the encrypted device programming files or to gain access to the device programming files. In this regard, encryption and protection may be substantially similar restrictions on the device programming files that they may be referred to interchangeably. When the device programming files have been decrypted, the system manager 208 may transfer the device programming files to the corresponding programmable sensor agents via the network 212.

The system manager 208 may also be adapted to execute code or software that may be adapted to perform control, management, and/or maintenance operations that may be utilized in the operation and/or the configuration of the configurable security and surveillance system 200.

Figure 2B:
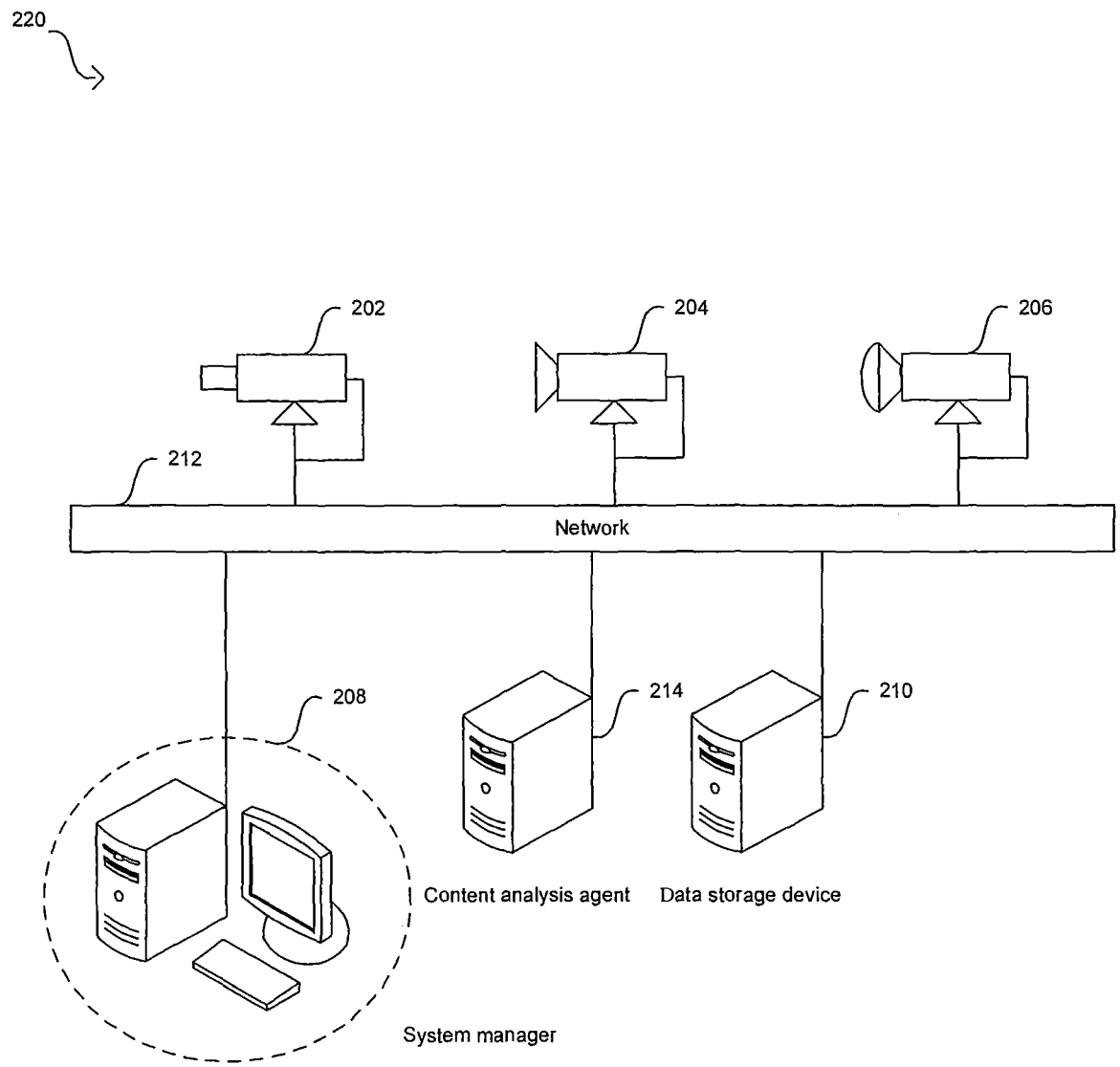
FIG. 2B illustrates an exemplary configurable security and surveillance system with programmable sensor agents and a programmable content analysis agent, in accordance with an embodiment of the invention.

FIG. 2B illustrates an exemplary configurable security and surveillance system with programmable sensor agents and a programmable content analysis agent, in accordance with an embodiment of the invention. Referring to FIG. 2B, there is shown a configurable security and surveillance system 220 that differs from the configurable security and surveillance system 200 in FIG. 2A in that a programmable content analysis agent 214 is shown communicatively coupled to the network 212.

The programmable content analysis agent 214 may comprise suitable logic, circuitry, and/or code that may be adapted to perform sensor analysis operations and/or security analysis operations. For example, sensor analysis operations may comprise, but need not be limited to, processing sensor information, classifying sensor information, and/or generating control information that may be transferred to other programmable sensor agents in the configurable security and surveillance system 220. Security analysis operations may comprise, but need not be limited to, identifying security anomalies, managing emergency situations, providing access control, and/or triggering alarms, for example. The results of sensor analysis operations may be utilized to generate and/or add information to a comprehensive knowledge base that may be utilized by, for example, the security analysis operations. In this regard, the programmable content analysis agent 214 may store at least a portion of the results generated by the sensor analysis operations. Storage of the results generated by the sensor analysis operations may be local on the programmable content analysis agent 214 and/or on the data storage device 210. The programmable content analysis agent 214 may correspond to a specified network address in the network 212. In some instances, more than one programmable content analysis agent 214 may be utilized by the configurable security and surveillance system 220.

The programmable content analysis agent 214 may also be adapted to receive control information from the system manager 208 via the network 212. Moreover, the programmable content analysis agent 214 may be adapted to be programmed or configured by the system manager 208. In this regard, the programming or configuration may be performed to add, remove, and/or upgrade features that correspond to the sensor analysis operations and/or security analysis operations performed by the programmable content analysis agent 214. The programming or configuration may be performed dynamically, that is, while the configurable security and surveillance system 220 is in operation. In other instances, the programming or configuration may be performed during installation or during maintenance periods when at least a portion of the configurable security and surveillance system 220 is not in operation.

Figure 2C:
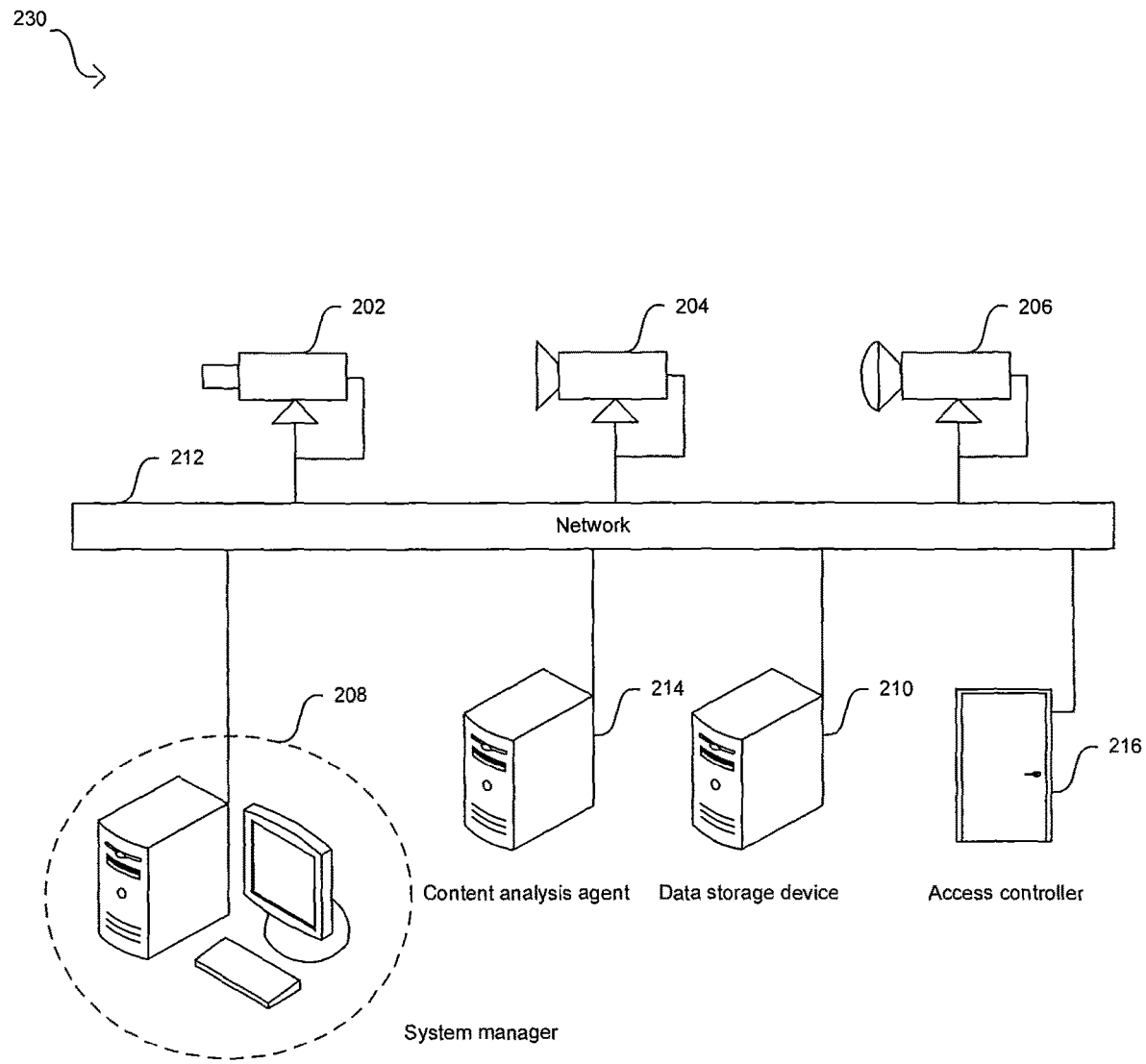
FIG. 2C illustrates an exemplary configurable security and surveillance system with programmable sensor agents, programmable content analysis agent, and an access controller, in accordance with an embodiment of the invention.

FIG. 2C illustrates an exemplary configurable security and surveillance system with programmable sensor agents, programmable content analysis agent, and an access controller, in accordance with an embodiment of the invention. Referring to FIG. 2C, there is shown a configurable security and surveillance system 230 that differs from the configurable security and surveillance system 220 in FIG. 2B in that an access controller 216 is shown communicatively coupled to the network 212.

The access controller 216 may comprise suitable logic, circuitry, and/or code that may be adapted to provide access to specified locations based on a verified security clearance. For example, upon keycard and/or biometric information verification, a user may enter a specified location or site in a building or campus covered by the configurable security and surveillance system 230. Access to that area by the user may be further detected by, for example, video surveillance functions provided by at least one programmable sensor agent located in the specified location or site. The programmable sensor agents may transfer information regarding the user to the programmable content analysis agent 214. The programmable content analysis agent 214 may process the user information and may add the results to other information that may have been generated on that user and that may be currently stored information in the programmable content analysis agent 214 and/or in the data storage device 210. A user may be represented by a label in the configurable security and surveillance system 230 and the user label may correspond to a data structure comprising information related that user.

In another example, security and/or emergency personnel may be searching or attempting to locate a specified user. In this regard, the security and/or emergency personnel may query the configurable security and surveillance system 230 by label to locate the specified user. Data available on the data structure that corresponds to the user label may be utilized to accurately determine of the user's location. When additional data is required, the configurable security and surveillance system 230 may send control information to at least a portion of the programmable sensor agents and/or the access controller 216 to obtain additional data that may be utilized to locate the specified user.

The access controller 216 may provide an additional security function to the other security functions, for example, video surveillance, performed by the configurable security and surveillance systems 230. This additional security function may be controlled, at least in part, by the system manager 208. Moreover, the programmable content analysis agent 214 may be utilized to integrate at least a portion of the access control functions and other security functions.

Figure 3:
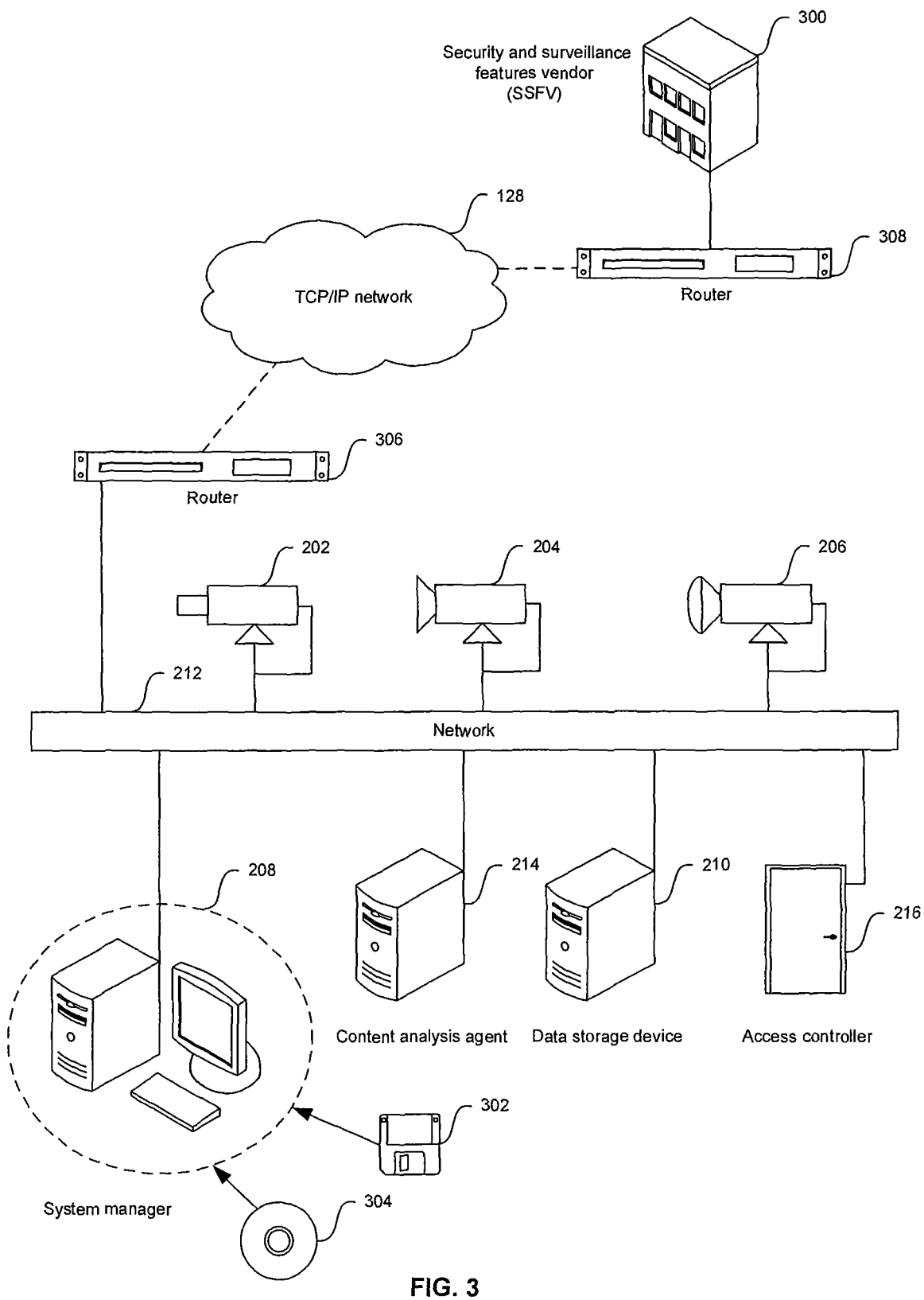
FIG. 3 illustrates an exemplary network comprising a configurable security and surveillance system and an e-commerce vendor, in accordance with an embodiment of the invention.

FIG. 3 illustrates an exemplary network comprising a configurable security and surveillance system and an e-commerce vendor, in accordance with an embodiment of the invention. Referring to FIG. 3, there is shown the configurable security and surveillance system 230 as described in FIG. 2C, a security and surveillance features vendor (SSFV) 300, a first machine-readable media 302, a second machine-readable media 304, a first router 306, a second router 308, and the TCP/IP network 128 as described in FIG. 1B.

The first router 306 may comprise suitable logic, circuitry, code, and/or hardware that may be adapted to communicatively couple the network 212 in the configurable security and surveillance system 230 to the TCP/IP network 128. The second router 308 may comprise suitable logic, circuitry, code, and/or hardware that may be adapted to communicatively couple the SSFV 300 to the TCP/IP network 128.

The first machine-readable media 302 and the second machine-readable media 304 are examples of media that may be utilized to provide the configurable security and surveillance system 230 with device programming files, decryption keys, and/or operating software or code that may be utilized by the system manager 208, the programmable content analysis agent 214, the data storage device 210, and/or the access controller 216. While the first machine-readable media 302 as shown corresponds to at least one diskette and the second machine-readable media 304 as shown corresponds to at least one optical disk, other machine-readable media may also be utilized in this regard.

The SSFV 300 may be an e-commerce vendor that provides a plurality of features that may be programmed into a programmable agent in the configurable security and surveillance system 230. A programmable agent may refer to a programmable sensor agent such as those represented by the programmable sensor agents 202, 204, and 206 and/or a programmable content analysis agent 214. The SSFV 300 may be adapted to receive requests for device programming files and/or decryption keys that may be utilized to configure or program at least one of the programmable agents. Decryption keys may be requested from the SSFV 300 when at least a portion of the device programming files is encrypted. The SSFV 300 may transfer any requested programming files and/or decryption keys to the system manager 208 via the TCP/IP network 128 and the network 212. In some instances, the SSFV 300 may transfer any requested programming files and/or decryption keys to the system manager 208 via at least one machine-readable media.

Figure 4A:
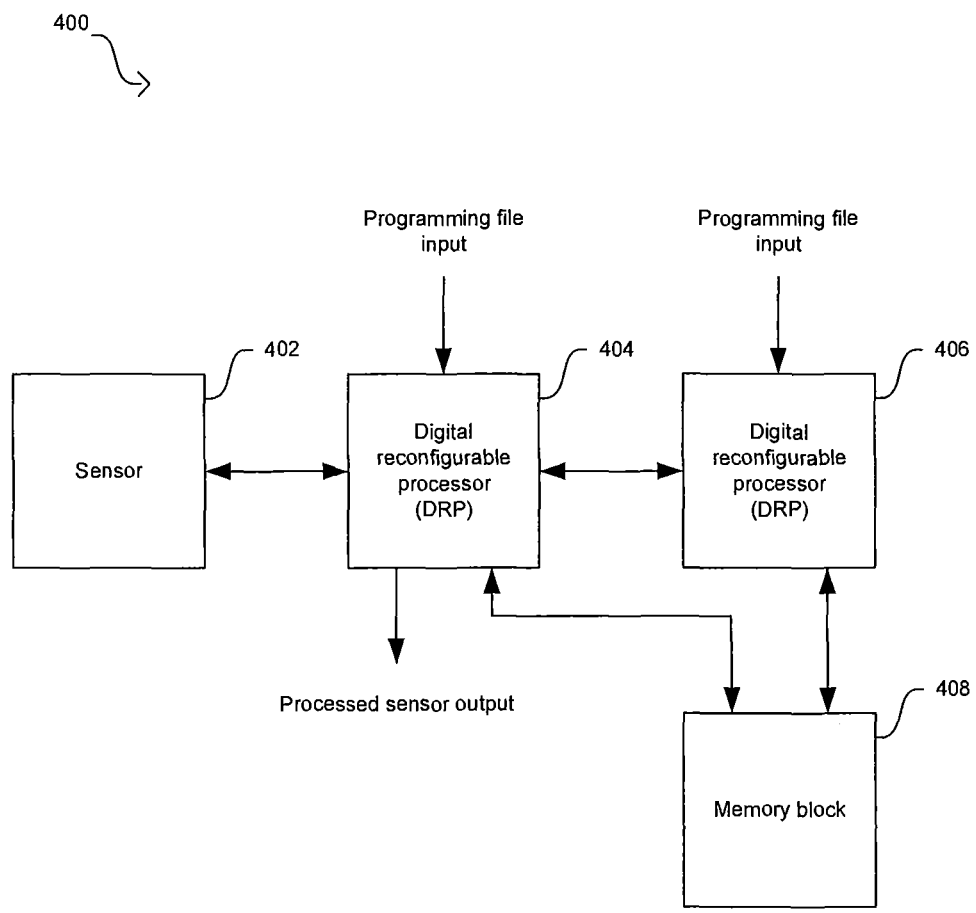
FIG. 4A is a block diagram of an exemplary programmable sensor agent, in accordance with an embodiment of the invention.

FIG. 4A is a block diagram of an exemplary programmable sensor agent, in accordance with an embodiment of the invention. Referring to FIG. 4A, there is shown a programmable sensor agent 400 that comprises a sensor 402, a first digital reconfigurable processor (DRP) 404, a second DRP 406, and a memory block 408. The sensor 402 may comprise suitable logic, circuitry, code, and/or hardware that may be adapted to detect physical events. For example, for security functions that require video surveillance, the sensor 402 may be a solid-state image sensor that may be implemented utilizing CMOS or CCD technology. The sensor 402 may be adapted to generate at least one signal that corresponds to the detected physical events. The sensor 402 may be also adapted to receive control information and/or to transfer generated signals that correspond to the detected physical events to the first DRP 404.

The first DRP 404 and the second DRP 406 may comprise suitable logic, circuitry, and/or code that may be adapted to provide digital processing. The first DRP 404 and the second DRP 406 may be referred to a configurable devices that may adapted to be configured or programmed in order to provide at least one feature for at least one security function. The first DRP 404 or the second DRP 406 may be a digital signal processor (DSP), a central processing unit (CPU), a field programmable gate array (FPGA), or a complex programmable logic device (CPLD), for example.

The programmable sensor agent 400 may receive at least one device programming file to program or configure at least a portion of the first DRP 404 and/or at least a portion of the second DRP 406. The device programming files may be code, embedded code, firmware, and/or compiled hardware description language (HDL) code in accordance with the type of configurable device. For example, when utilizing a DSP and/or a CPU as configurable devices, at least a portion of the embedded code that is executed on the configurable device may be configured to provide new, additional, and/or upgraded features. In another example, when utilizing an FPGA and/or a CPLD as configurable devices, at least a portion of the logic in the configurable device may be configured or programmed to provide new, additional, and/or upgraded features. In some instances, an FPGA and/or a CPLD configurable device may be utilized as a processing engine that may be able to support an embedded operating system (OS), such as Linux, for example. In such instances, the logic and/or the embedded code that is executed on the FPGA and/or the CPLD configurable device may be configured or programmed to provide new, additional, and/or upgraded features.

The memory block 408 may comprise suitable logic, circuitry, and/or code that may be adapted to store information generated from the first DRP 404 and/or the second DRP 406. The memory block 408 may also be adapted to transfer stored information to the first DRP 404 and/or the second DRP 406. The memory block 408 may comprise at least one memory device. In some instances, the device programming files may be stored in the memory block 408 and may be transferred to the first DRP 404 and/or the second DRP 406 from the memory block 408.

As shown in FIG. 4A, the programmable sensor agent 400 may be adapted for video surveillance functions. For example, the sensor 402 may capture video information and may provide front-end processing of the captured sensor information. When the sensor 402 is a color image sensor, for example, the front-end operations performed by the sensor 402 may comprise automatic gain control (AGC), color balancing, and/or white balancing. The first DRP 404 may receive the front-end processed video information from the sensor 402, and may perform additional image processing features such as image interpolation, image correction, dynamic range enhancement, and/or noise filtering, for example. The first DRP 404 may also be adapted to generate a processed sensor output from the sensor information.

The second DRP 406 may receive at least a portion of the processed sensor information and may be adapted to provide image analysis and/or failure management for the programmable sensor agent 400. For example, in case of a system failure, the second DRP 404 may activate a backup power source to the programmable sensor agent 400. Moreover, the second DRP 406 may also be adapted to provide maintenance features that may be operated at specified times. For example, the second DRP 406 may be configured or programmed to detect dirt on a lens on the image sensor by analyzing at least a portion of the processed video information generated by the first DRP 404. When the lens is dirty, for example, a signal or message may be sent to the system manager 208 so that further action may be taken.

Figure 4B:
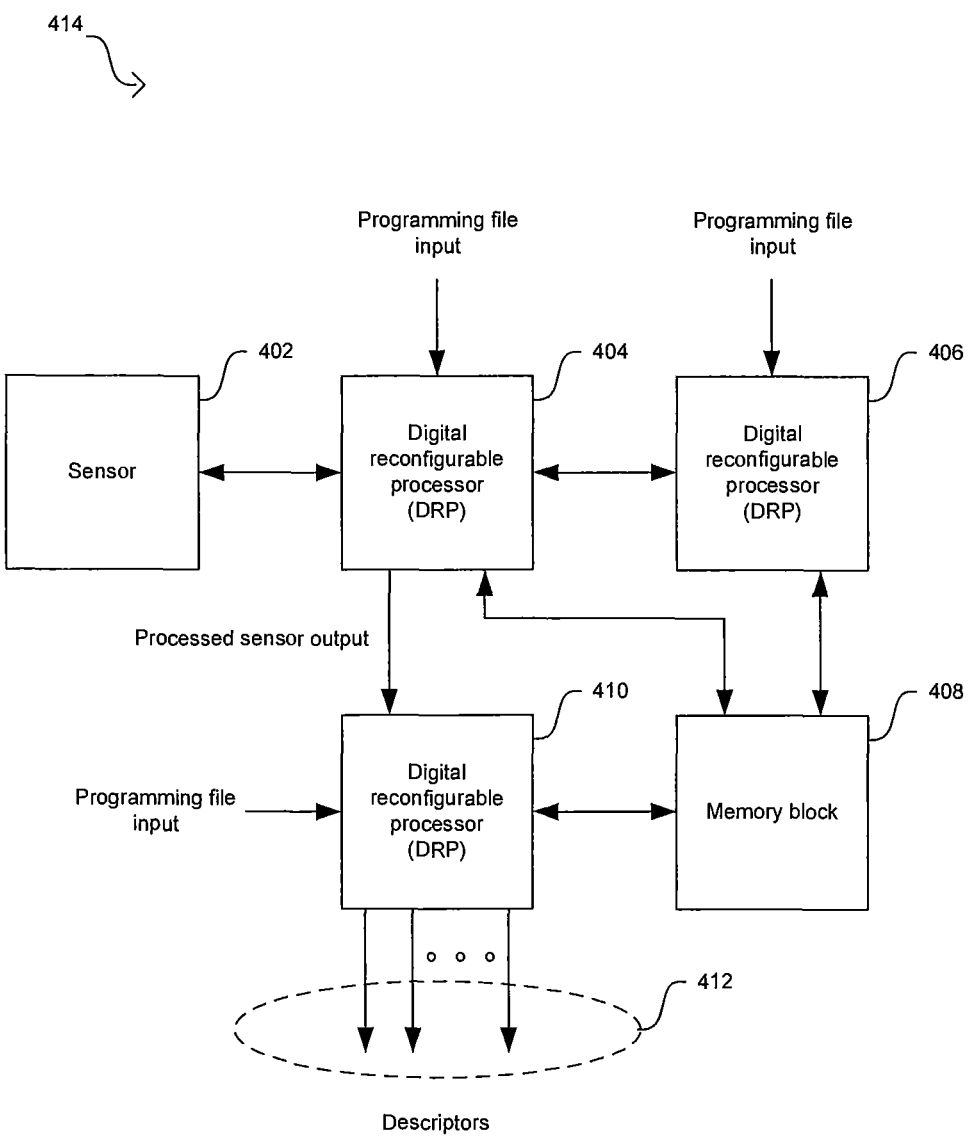
FIG. 4B is a block diagram of an exemplary programmable sensor agent adapted to generate descriptors, in accordance with an embodiment of the invention.

FIG. 4B is a block diagram of an exemplary programmable sensor agent adapted to generate descriptors, in accordance with an embodiment of the invention. Referring to FIG. 4B, there is shown a programmable sensor agent 414 that differs from the programmable sensor agent 400 in FIG. 4A in that a third DRP 410 is communicatively coupled to the first DRP 404. The third DRP 410 may be a configurable device substantially as described for the first DRP 404 and the second DRP 406. The third DRP 410 may be utilized to generate data content descriptors from the processed sensor output generated by the first DRP 404.

As shown, the third DRP 410 may be adapted for video surveillance functions by further processing the processed sensor output generated by the first DRP 404. In this regard, the third DRP 410 may be adapted to generate video content descriptors. The video content descriptors may be, for example, motion and/or color descriptors. Motion descriptors may result as a byproduct of other video or image processing operations such a video compression, for example. A plurality of descriptors may be generated in accordance with the level of integration desired among security functions.

Figure 4C:
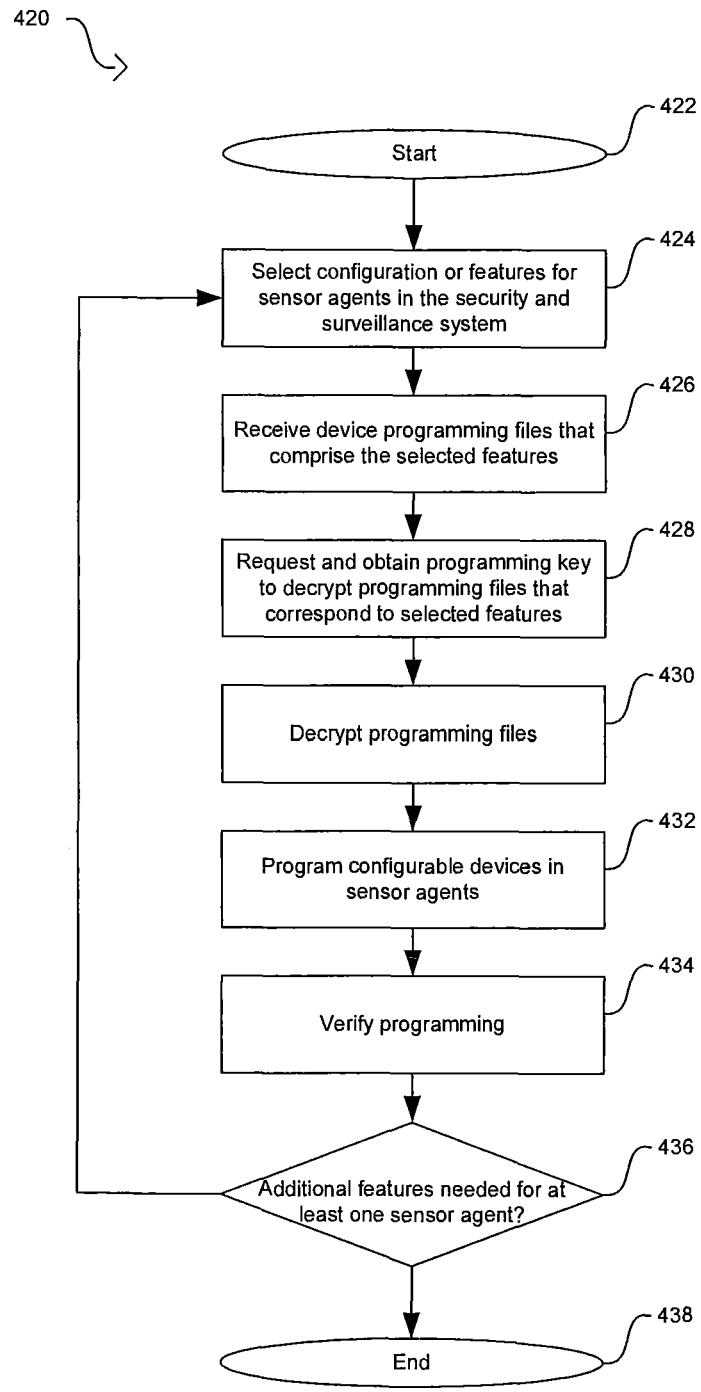
FIG. 4C is a flow diagram illustrating exemplary steps for configuring a programmable sensor agent, in accordance with an embodiment of the invention.

FIG. 4C is a flow diagram illustrating exemplary steps for configuring a programmable sensor agent, in accordance with an embodiment of the invention. Referring to FIG. 4C, after start step 422, in step 424, features may be selected that may be programmed into at least one configurable device in at least one programmable sensor agent in a configurable security and surveillance system. In step 426, an e-commerce feature vendor may provide device programming files for the selected features. The device programming files may be transfer to the configurable security and surveillance system via a network connection and/or via machine-readable media. In step 428, decryption keys may be requested and obtained from the e-commerce feature vendor for device programming files that are encrypted. The decryption keys may be provided to the configurable security and surveillance system via a network connection and/or via machine-readable media.

In step 430, the encrypted device programming files may be decrypted by utilizing the decryption keys received in step 428. In step 432, the device programming files may be transferred to the programmable sensor agents to program the configurable devices. In step 434, the programming of the configurable devices in the programmable sensor agents may be verified. In step 436, a user and/or installer of the configurable security and surveillance system may determine whether new, additional, and/or upgraded features may be necessary in at least one programmable sensor agent. When a user may find new, additional, and/or upgraded features necessary, the flow chart 420 may proceed to step 424 where new, additional, and/or upgraded features may be selected. When a user may not require new, additional, and/or upgraded features, the flow chart 420 may proceed to end step 438.

Figure 5A:
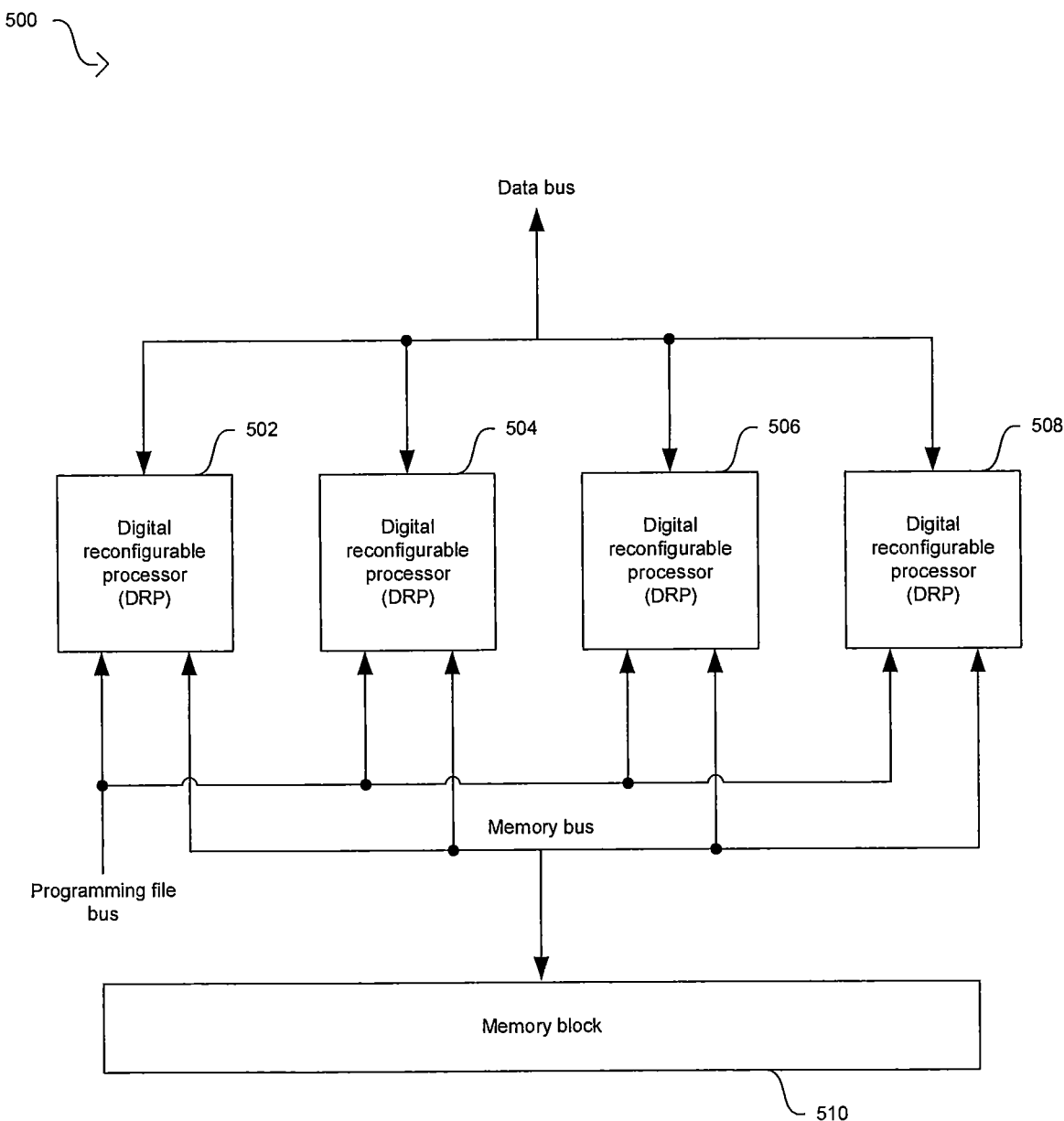
FIG. 5A is a block diagram of an exemplary programmable content analysis agent, in accordance with an embodiment of the invention.

FIG. 5A is a block diagram of an exemplary programmable content analysis agent, in accordance with an embodiment of the invention. Referring to FIG. 5A, there is shown a programmable content analysis agent 500 that comprises a first DRP 502, a second DRP 504, a third DRP 506, a fourth DRP 508, and a memory block 510. In some instances, more or fewer digital reconfigurable processors may be utilized.

The first DRP 502, the second DRP 504, the third DRP 506, and the fourth DRP 508 may comprise suitable logic, circuitry, and/or code that may be adapted to provide digital processing and may be referred to a configurable devices that may adapted to be configured or programmed in order to provide at least one feature for at least one security function. The first DRP 502, the second DRP 504, the third DRP 506, and the fourth DRP 508 may be a digital signal processor (DSP), a central processing unit (CPU), a field programmable gate array (FPGA), or a complex programmable logic device (CPLD), for example.

The programmable content analysis agent 500 may receive at least one device programming file to program or configure at least a portion of the first DRP 502, the second DRP 504, the third DRP 506, and/or the fourth DRP 508. The configurable devices may be programmed or configured via a programming file bus, for example. The device programming files may be code, embedded code, firmware, and/or compiled hardware description language (HDL) code in accordance with the type of configurable device. For example, when utilizing a DSP and/or a CPU as configurable devices, at least a portion of the embedded code that is executed on the configurable device may be configured to provide new, additional, and/or upgraded features. In another example, when utilizing an FPGA and/or a CPLD as configurable devices, at least a portion of the logic in the configurable device may be configured or programmed to provide new, additional, and/or upgraded features. In some instances, an FPGA and/or a CPLD configurable device may be utilized as a processing engine that may be able to support an embedded operating system (OS), such as Linux, for example. In such instances, the logic and/or the embedded code that is executed on the FPGA and/or the CPLD configurable device may be configured or programmed to provide new, additional, and/or upgraded features.

The memory block 510 may comprise suitable logic, circuitry, and/or code that may be adapted to store information generated from the first DRP 502, the second DRP 504, the third DRP 506, and/or the fourth DRP 508. The memory block 510 may also be adapted to transfer stored information to the first DRP 502, the second DRP 504, the third DRP 506, and/or the fourth DRP 508. The memory block 510 may comprise at least one memory device. In some instances, the device programming files may be stored in the memory block 510 and may be transferred to the first DRP 502, the second DRP 504, the third DRP 506, and the fourth DRP 508 from the memory block 408. Communication between the configurable devices and the memory block 510 may be performed via a memory bus, for example.

As shown in FIG. 5A, the programmable sensor agent 500 may be adapted to perform sensor analysis operations and/or security analysis operations. The sensor analysis operations may correspond to video surveillance functions, for example. In this regard, a portion of the first DRP 502, the second DRP 504, the third DRP 506, and/or the fourth DRP 508 may be utilized for video surveillance features and a remaining portion may be utilized for security analysis operations. For example, video surveillance features may comprise motion detection, generation of shape descriptors, object tracking, and/or object surveillance. Security analysis operations may comprise security event classification, generating control information to be transferred to programmable sensor agents, and/or system failure detection, for example.

In this regard, the first DRP 502, the second DRP 504, the third DRP 506, and/or the fourth DRP 508 may be utilized to further process information or content generated by the programmable sensor agents. The first DRP 502, the second DRP 504, the third DRP 506, and/or the fourth DRP 508 may communicate with the programmable sensor agents in a configurable security and surveillance system via a data bus, for example.

Figure 5B:
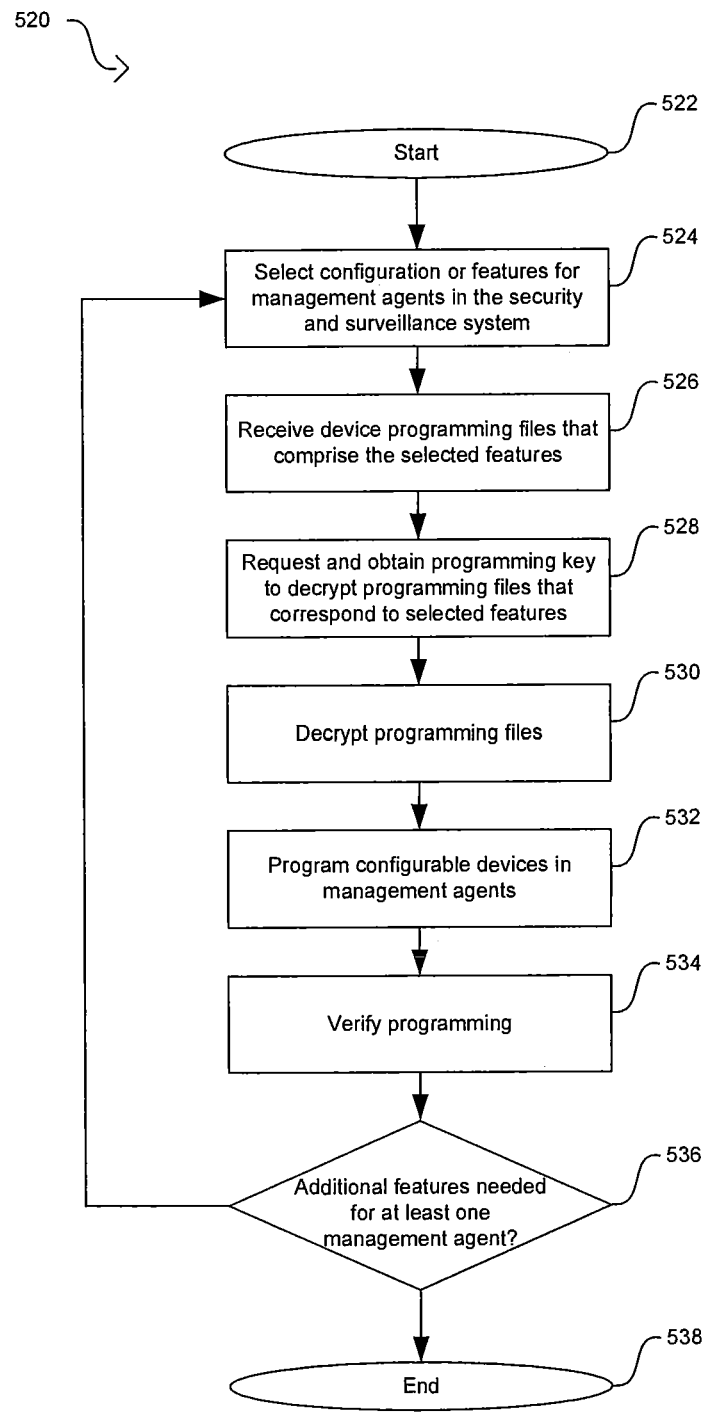
FIG. 5B is a flow diagram illustrating exemplary steps for configuring a programmable content analysis agent, in accordance with an embodiment of the invention.

FIG. 5B is a flow diagram illustrating exemplary steps for configuring a programmable content analysis agent, in accordance with an embodiment of the invention. Referring to FIG. 5B, after start step 522, in step 524, features may be selected that may be programmed into at least one configurable device in at least one programmable content analysis agent in a configurable security and surveillance system. In step 526, an e-commerce feature vendor may provide device programming files for the selected features. The device programming files may be transfer to the configurable security and surveillance system via a network connection and/or via machine-readable media. In step 528, decryption keys may be requested and obtained from the e-commerce feature vendor for device programming files that are encrypted. The decryption keys may be provided to the configurable security and surveillance system via a network connection and/or via machine-readable media.

In step 530, the encrypted device programming files may be decrypted by utilizing the decryption keys received in step 528. In step 532, the device programming files may be transferred to the programmable content analysis agents to program the configurable devices. In step 534, the programming of the configurable devices in the programmable content analysis agents may be verified. In step 536, a user and/or installer of the configurable security and surveillance system may determine whether new, additional, and/or upgraded features may be necessary in at least one programmable content analysis agent. When a user may find new, additional, and/or upgraded features necessary, the flow chart 520 may proceed to step 524 where new, additional, and/or upgraded features may be selected. When a user may not require new, additional, and/or upgraded features, the flow chart 520 may proceed to end step 538.

Figure 6A:
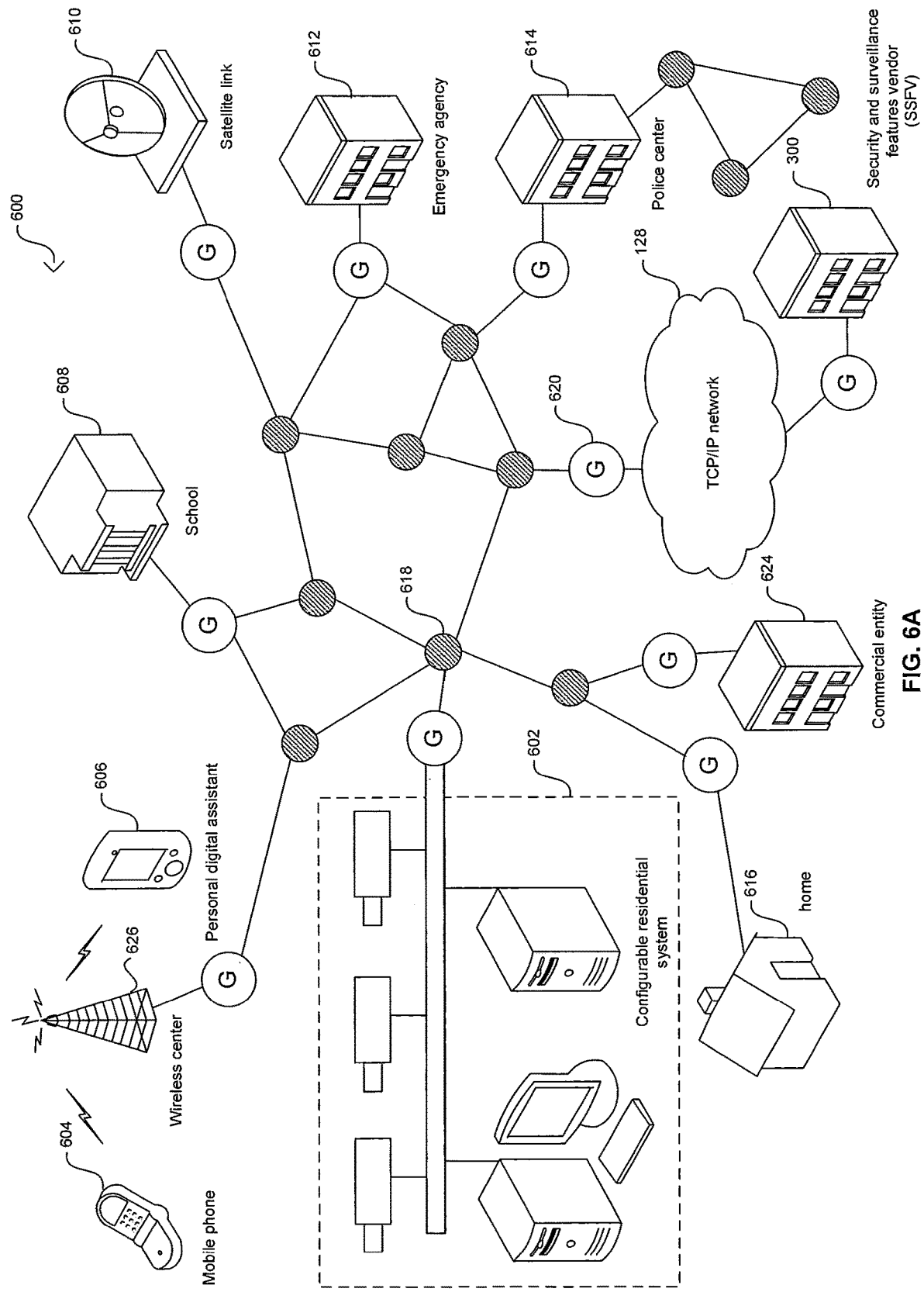
FIG. 6A illustrates an exemplary network comprising a residential configurable security and surveillance system, in accordance with an embodiment of the invention.

FIG. 6A illustrates an exemplary network comprising a residential configurable security and surveillance system, in accordance with an embodiment of the invention. Referring to FIG. 6A, there is shown a network 600 that comprises a residential configurable security and surveillance system 602 substantially as described in FIGS. 2A-2C, a mobile phone 604, a wireless center 626, a personal digital assistant (PDA) 606, a school 608, a satellite link 610, an emergency agency 612, a police center 614, a home 616, at least one core router 618, at least one gate router 620, a commercial entity 624, a security and surveillance features vendor (SSFV) 300 as described in FIG. 3, and a TCP/IP network 128 as described in FIG. 1B. The residential configurable security and surveillance system 602 may be adapted to provide security functions for a home and/or small commercial entities.

In operation, the SSFV 300 may provide device programming files and/or decryption keys to configure the configurable security and surveillance system 602 via the TCP/IP network 128 and the network of at least one gate router 620 and at least one core router 618. The features provided by the device programming files may support access to the configurable security and surveillance system 602 via the mobile phone 604 and/or the PDA 606 to a user. The user may utilize the mobile phone 604 and/or the PDA 606 as an interface to control at least a portion of the operations and/or display at least a portion of the contents generated by the configurable security and surveillance system 602. In this regard, the user may utilize the network of at least one gate router 620 and at least one core router 618 to communicatively couple the wireless center 626 and the configurable security and surveillance system 602.

The configurable security and surveillance system 602 may be adapted to generate appropriate emergency signals and/or alarms to, for example, the school 608, the satellite link 610, the emergency agency 612, the police center 614, the commercial entity 624, and/or at least one home 616 in accordance with the features configured into the residential configurable security and surveillance system 602. For example, security breaches may be r ported to any of these locations in accordance to the features supported by the residential configurable security and surveillance system 602. The types of security breaches and/or the locations to which the appropriate emergency signals are sent may depend on the security features received from the SSFV 300.

Figure 6B:
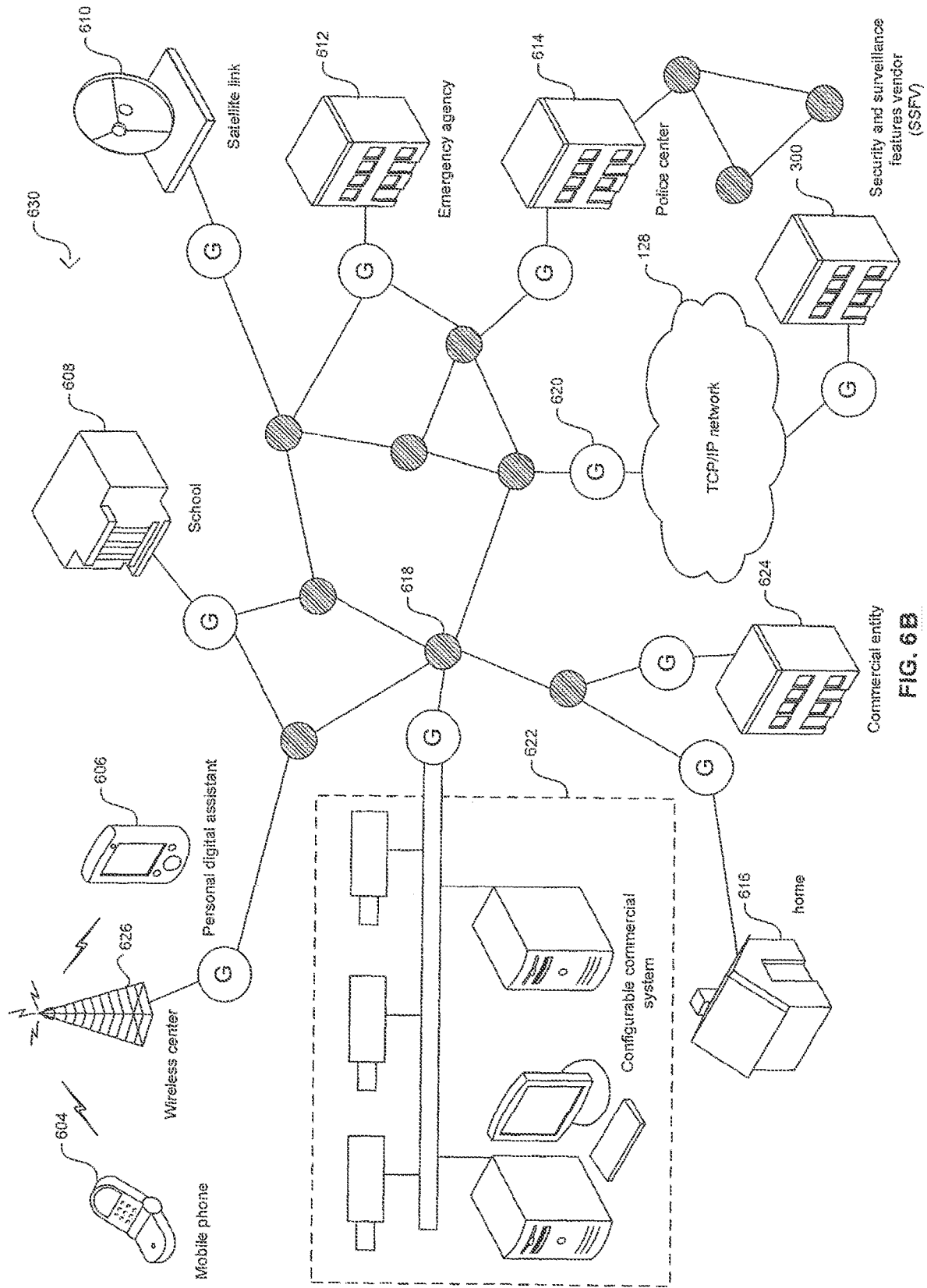
FIG. 6B illustrates an exemplary network comprising a commercial configurable security and surveillance system, in accordance with an embodiment of the invention.

FIG. 6B illustrates an exemplary network comprising a commercial configurable security and surveillance system, in accordance with an embodiment of the invention. Referring to FIG. 6B, there is shown a network 630 that differs from the network 600 in FIG. 6A in that a commercial configurable security and surveillance system 622 is utilized. The commercial configurable security and surveillance system 602 may be adapted to provide security functions for a large commercial entities and/or governmental entities. In this regard, the commercial configurable security and surveillance system 622 may be adapted to support a large number and wide range of programmable sensor agents and programmable content analysis agents. Moreover, new, additional, and/or upgraded features may be provided periodically and/or routinely by the SSFV 300 as a result of a commercial agreement.

The approach described herein may result in more effectively and/or efficiently integrated security and surveillance systems. The use of configurable devices in the programmable sensor agents and the programmable content analysis agents provides significant flexibility in the system architecture and may also increase the length of operation of a security and surveillance system before significant investments are required. In this regard, a user may determine the security functions and features necessary to their security operations while maintaining the ability to add and/or modify their security operations without having to replace significant portions of their existing hardware and/or software.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed:

1. A system for configuring a security and/or surveillance system, the system comprising:
   machine readable media having available a selection of a plurality of programmable features for a plurality of programmable sensor agents;
   wherein on receipt of a request for a programmable feature from the plurality of programmable features, the system is configured to:
   provide a device programming file corresponding to the requested programmable feature of the plurality of programmable features to a programmable sensor agent of the plurality of programmable sensor agents; the programmable sensor agent comprising a display interface; and
   provide at least one programming key corresponding to the device programming file to the programmable sensor agent;
   wherein the device programming file, after receipt at the programmable sensor agent, is configured to cause the programmable sensor agent to:
   program a configurable device in the programmable sensor agent to perform at least the selected programmable feature, the selected programmable feature enabling functionality in the programmable sensor agent not previously performed in the programmable sensor agent; and
   verify the programming of the configurable device.

2. The system of claim 1, wherein the programmable sensor agent further comprises a network interface, an image processor, and an image sensor.

3. The system of claim 2, wherein the image processor comprises the configurable device.

4. The system of claim 2, wherein the network interface receives the device programming file.

5. The system of claim 2, wherein the network interface receives the at least one programming key corresponding to the device programming file.

6. The system of claim 2, wherein the programmable sensor agent further comprises a processor, and the processor programs at least a portion of the image processor to perform the new feature, the programming based on the received device programming file.

7. The system of claim 6, wherein the processor verifies the programming of the image processor.

8. The system of claim 2, wherein the network interface decrypts the device programming file using the at least one programming key.

9. The system of claim 4, wherein the network interface receives the device programming file via a network transfer from a system manager.

10. The system of claim 1, wherein the programmable sensor agent comprises a backup battery.

11. The system of claim 1, wherein the display interface selects the programmable feature.

12. The system of claim 1, wherein the programmable sensor agent comprises a memory.

13. The system of claim 12, wherein the memory stores at least a portion of the received device programming file.

14. The system of claim 6, wherein the processor programs the at least a portion of the image processor via a Joint Test Action Group (JTAG) interface.

15. The system of claim 6, wherein the processor verifies the programming of the at least a portion of the image processor via a Joint Test Action Group (JTAG) interface.

16. The system of claim 1, wherein the programmable sensor agent is a surveillance video camera.

17. A non-transitory machine-readable media having stored thereon, a computer program having at least one code for configuring a security and/or surveillance system, the at least one code being executable by a machine for causing the machine to perform steps comprising:
   providing a display interface allowing selection of at least one new feature for addition to or for upgrade of a programmable sensor agent of the security and/or surveillance system from a plurality of features;
   receiving a device programming file in the programmable sensor agent, the device programming file corresponding to the at least one new feature selected for addition to or for upgrade of the programmable sensor agent;
   receiving at least one programming key corresponding to the device programming file;
   programming at least one configurable device in the programmable sensor agent to perform at least the selected at least one new feature, the programming based on the received device programming file, and wherein the new feature enables functionality in the programmable sensor agent not previously performed in the programmable sensor agent prior to the programming; and
   verifying the programming of the at least one configurable device in the programmable sensor agent.

18. The machine-readable media according to claim 17, comprising code for decrypting the device programming file using the at least one programming key.

19. The machine-readable media according to claim 17, wherein the programmable sensor agent is a surveillance video camera.

20. The machine-readable media according to claim 17, comprising code for receiving the device programming file via a network transfer.

21. The machine-readable media according to claim 17, comprising code for selecting the device programming file via a display interface in the programmable sensor agent.

22. The machine-readable media according to claim 17, comprising code for storing at least a portion of the received device programming file in the programmable sensor agent.

23. The machine-readable media according to claim 17, comprising code for programming the at least one configurable device via a processor.

24. The machine-readable media according to claim 23, comprising code for programming the at least one configurable device via a Joint Test Action Group (JTAG) interface in the processor.

25. The machine-readable media according to claim 23, comprising code for verifying the programming of the at least one configurable device via a Joint Test Action Group (JTAG) interface in the processor.

* * * * *